United States Patent
Wang et al.

(10) Patent No.: US 11,316,669 B2
(45) Date of Patent: Apr. 26, 2022

(54) AUDIT RESULT DATA STORAGE METHOD AND DEVICE, AUDIT RESULT DATA QUERY METHOD AND DEVICE, AND AUDIT ITEM STORAGE METHOD AND DEVICE

(71) Applicant: TENCENT TECHNOLOGY (SHENZHEN) COMPANY LIMITED, Shenzhen (CN)

(72) Inventors: Dongyan Wang, Shenzhen (CN); Maocai Li, Shenzhen (CN); Bo Li, Shenzhen (CN); Haitao Tu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 14 days.

(21) Appl. No.: 17/073,191

(22) Filed: Oct. 16, 2020

(65) Prior Publication Data
US 2021/0105133 A1    Apr. 8, 2021

Related U.S. Application Data

(63) Continuation of application No. PCT/CN2019/108666, filed on Sep. 27, 2019.

(30) Foreign Application Priority Data

Oct. 10, 2018    (CN) .......................... 201811179316.6

(51) Int. Cl.
G06F 21/64    (2013.01)
H04L 9/08    (2006.01)
(Continued)

(52) U.S. Cl.
CPC ............ *H04L 9/0825* (2013.01); *G06F 21/36* (2013.01); *G06F 21/6227* (2013.01);
(Continued)

(58) Field of Classification Search
CPC ... H04L 9/0825; H04L 9/0637; H04L 9/0643; H04L 9/0866; H04L 2209/38;
(Continued)

(56) References Cited

U.S. PATENT DOCUMENTS 8,639,753 B1    1/2014    Meadows
8,943,332 B2 *  1/2015    Horne ..................... G06F 21/33
                                                        713/193
(Continued)

FOREIGN PATENT DOCUMENTS

CN    103136243 A    6/2013
CN    105072086 A    11/2015
(Continued)

OTHER PUBLICATIONS

The State Intellectual Property Office of the People's Republic of China (SIPO) Office Action 1 for 201811179316.6 dated Mar. 5, 2021 20 Pages (including translation).
(Continued)

*Primary Examiner* — Izunna Okeke
(74) *Attorney, Agent, or Firm* — Anova Law Group, PLLC

(57) ABSTRACT

This application discloses an audit result data storage method and device, an audit result data query method and device, an audit item storage method and device, an electronic device and a medium. The method includes obtaining a first hash value of audit result data of a first user; signing the first hash value according to a private key of the first user to obtain first signature data; and transmitting the first signature data to an audit result data storage subsystem, the audit result data storage subsystem being configured to store data in the form of a blockchain.

16 Claims, 11 Drawing Sheets

(51) Int. Cl.
  *G06F 21/36* (2013.01)
  *G06F 21/62* (2013.01)
  *H04L 9/06* (2006.01)

(52) U.S. Cl.
  CPC .......... *H04L 9/0637* (2013.01); *H04L 9/0643* (2013.01); *H04L 9/0866* (2013.01)

(58) Field of Classification Search
  CPC ... H04L 9/3239; H04L 9/3247; H04L 9/3263; G06F 21/36; G06F 21/6227; G06F 2221/2105; G06F 21/64; G06F 16/33
  See application file for complete search history.

(56) References Cited

U.S. PATENT DOCUMENTS

| | | | |
|---|---|---|---|
| 10,826,685 B1 * | 11/2020 | Campagna | ............ H04L 9/3239 |
| 2014/0279953 A1 | 9/2014 | Aronovich | |
| 2017/0046652 A1 | 2/2017 | Haldenby et al. | |
| 2017/0126410 A1 | 5/2017 | Maximov et al. | |

FOREIGN PATENT DOCUMENTS

| | | | |
|---|---|---|---|
| CN | 105429760 | A | 3/2016 |
| CN | 106485168 | A | 3/2017 |
| CN | 106874253 | A | 6/2017 |
| CN | 107124403 | A | 9/2017 |
| CN | 107210910 | A | 9/2017 |
| CN | 107231351 | A | 10/2017 |
| CN | 107241317 | A | 10/2017 |
| CN | 107483585 | A | 12/2017 |
| CN | 107682308 | A | 2/2018 |
| CN | 107846278 | A | 3/2018 |
| CN | 107888375 | A | 4/2018 |
| CN | 108462724 | A | 8/2018 |
| CN | 108600199 | A | 9/2018 |
| CN | 108614974 | A | 10/2018 |
| WO | 2018089843 | A1 | 5/2018 |

OTHER PUBLICATIONS

Yuli Han et al., "Preliminary exploration of the influence path of blockchain on audit business," Shanxi Agricultural Economy, No. 13, Jul. 15, 2018 (Jul. 15, 2018), p. 107 2 pages.

The State Intellectual Property Office of the People's Republic of China (SIPO) Office Action 1 for 201911206332.4 dated Oct. 10, 2020 11 Pages (including translation).

The World Intellectual Property Organization (WIPO) International Search Report for PCT/CN2019/108666 dated Dec. 27, 2019 7 Pages (including translation).

* cited by examiner

AUDIT RESULT DATA STORAGE METHOD AND DEVICE, AUDIT RESULT DATA QUERY METHOD AND DEVICE, AND AUDIT ITEM STORAGE METHOD AND DEVICE

RELATED APPLICATION

This application is a continuation application of PCT Application No. PCT/CN2019/108666 filed on Sep. 27, 2019, which claims priority to Chinese Patent Application No. 201811179316.6, filed with the China National Intellectual Property Administration on Oct. 10, 2018, and entitled "AUDIT RESULT DATA STORAGE METHOD AND DEVICE, AUDIT RESULT DATA QUERY METHOD AND DEVICE, AND AUDIT ITEM STORAGE METHOD AND DEVICE". The two applications are both incorporated herein by reference in their entirety.

FIELD OF THE TECHNOLOGY

This application relates to the field of data storage, and in particular to an audit result data storage method and device, an audit result data query method and device, and an audit item storage method and device.

BACKGROUND OF THE APPLICATION

Audit refers to an independent supervision activity of pre-review and post-review conducted by a dedicated agency on major projects and financial revenues and expenditures of governments at all levels of a country, financial institutions, enterprises and public institutions. An audit may also refer to auditing targeting network security. An audit is a widely accepted supervision mechanism. However, in the current audit method, various audit institutions generally perform manual audit on materials submitted by an audited party, which involves the transmission of a large number of paper materials. The transmission of such materials is neither environment-friendly, nor conducive to data storage and confidentiality.

SUMMARY

According to embodiments provided in this application, an audit result data storage method and device, an audit result data query method and device, and an audit item storage method and device are provided.

One aspect of the present disclosure provides an audit result data storage method. The method is performed by a first electronic device. The method includes obtaining a first hash value of audit result data of a first user; signing the first hash value according to a private key of the first user to obtain first signature data; and transmitting the first signature data to an audit result data storage subsystem, the audit result data storage subsystem being configured to store data in the form of a blockchain.

Another aspect of the present disclosure provides an audit result storage system. The audit result storage system includes a first electronic device. The first electronic device includes a memory and a processor, the memory storing a computer program, the computer program. When executed by the processor, the computer program causing the processor to perform: obtaining a first hash value of audit result data of a first user; signing the first hash value according to a private key of the first user to obtain first signature data; and transmitting the first signature data to an audit result data storage subsystem, the audit result data storage subsystem being configured to store data in the form of a blockchain.

Another aspect of the present disclosure provides non-transitory computer-readable storage media storing computer programs. The computer programs, when executed by one or more processors, causing the one or more processors to perform operations of an audit result data storage method, the method comprising: obtaining, by a first electronic device, a first hash value of audit result data of a first user; signing, by the first electronic device, the first hash value according to a private key of the first user to obtain first signature data; and transmitting, by the first electronic device, the first signature data to an audit result data storage subsystem, the audit result data storage subsystem being configured to store data in the form of a blockchain.

Details of one or more embodiments of this application are provided in the accompanying drawings and description below. Other features, objectives, and advantages of this application become apparent from the specification, the accompanying drawings, and the claims.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It is to be understood that the specific embodiments described herein are merely used for explaining this application, and are not intended to limit this application.

Figure 1:
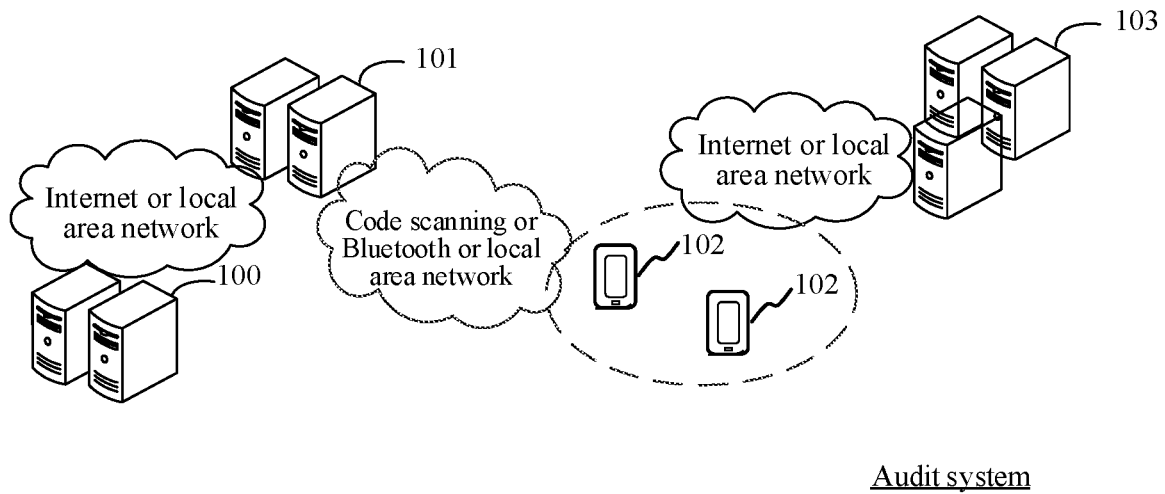
FIG. 1 is a system architecture diagram of an audit system according to an embodiment of this application.

FIG. 1 is a system architecture diagram of an audit system according to an embodiment of this application. Referring to FIG. 1, the audit system includes: an audit item storage subsystem 100, an on-site audit subsystem 101, at least one electronic device 102, and an audit result data storage subsystem 103.

The audit item storage subsystem 100 is configured to store audit items, and the stored audit items may be preconfigured by a system administrator or uploaded by a user in the system. The on-site audit subsystem 101 may establish a data connection with the audit item storage subsystem 100. The on-site audit subsystem 101 may obtain an audit object entered by an auditor, and may obtain, according to the obtained audit object, an audit item associated with the audit object from the audit item storage subsystem 100. The auditor may audit the audit item associated with the audit object in the on-site audit subsystem 101 to obtain audit result data. The on-site audit subsystem 101 can generate, based on the audit result data, a first hash value of the audit result data. The on-site audit subsystem further generates a first graphic identification code based on the first hash value, and displays the code on a screen of the on-site audit subsystem 101.

A first electronic device may scan the first graphic identification code to obtain the first hash value corresponding to the first graphic identification code, and transmit the first hash value to a corresponding trusted execution environment. The trusted execution environment may sign the first hash value according to a private key of a user of the first electronic device to obtain first signature data, and transmit the first signature data to the first electronic device. The first electronic device, after receiving the first signature data, transmits the first signature data to the audit result data storage subsystem 103. The audit result data storage subsystem 103, after receiving the first signature data, transmits a first evidence preservation certificate to a second electronic device. The second electronic device, when receiving the first evidence preservation certificate, obtains the first signature data from the audit result data storage subsystem 103, and the second electronic device transmits the first signature data to a trusted execution environment of the second electronic device. The trusted execution environment of the second electronic device signs the first signature data according to a private key of a user of the second electronic device to obtain second signature data, and then transmits the second signature data to the second electronic device.

The second electronic device, after receiving the second signature data, transmits the second signature data to the audit result data storage subsystem 103, the audit result data storage subsystem 103 being configured to store data in the form of a blockchain.

In one embodiment, the audit item storage subsystem 100 may include a server and a plurality of user-side devices, and a user may upload an audit item to the server through the user-side devices to implement centralized storage. In one embodiment, the audit item storage subsystem 100 may be in a decentralized form, that is, the audit item storage subsystem 100 includes a plurality of node devices, and each node device is provided with the same blockchain to store an audit item successfully verified by the plurality of node devices by consensus to implement decentralized data storage, thereby improving data security.

Figure 2:
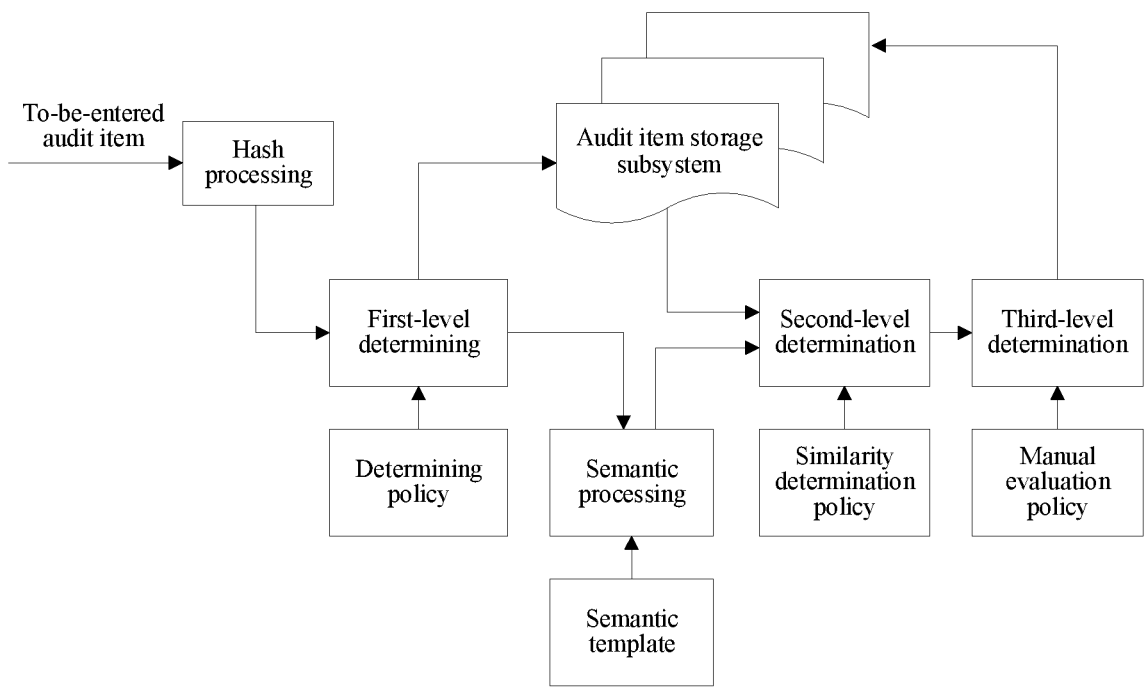
FIG. 2 is a diagram of functional composition involved in entry of an audit item according to an embodiment of this application.

Using a system architecture that stores an audit item in the form of a blockchain as an example, when storing audit items, the process steps (as shown in FIG. 2) may include hash processing, first-level determination (consistency determination), semantic processing, second-level determination (similarity determination) and third-level determination (a manual evaluation). Specifically, the foregoing process includes: obtaining a to-be-stored audit item; obtaining a second hash value of the to-be-stored audit item; performing, according to the second hash value, a query in hash values of existing audit items in an auditing domain to which the to-be-stored audit item belongs; and skipping storing the to-be-stored audit item, in a case that the hash values of the existing audit items include the same hash value as the second hash value. The to-be-stored audit item may also be referred as to-be-stored item.

Figure 3A:
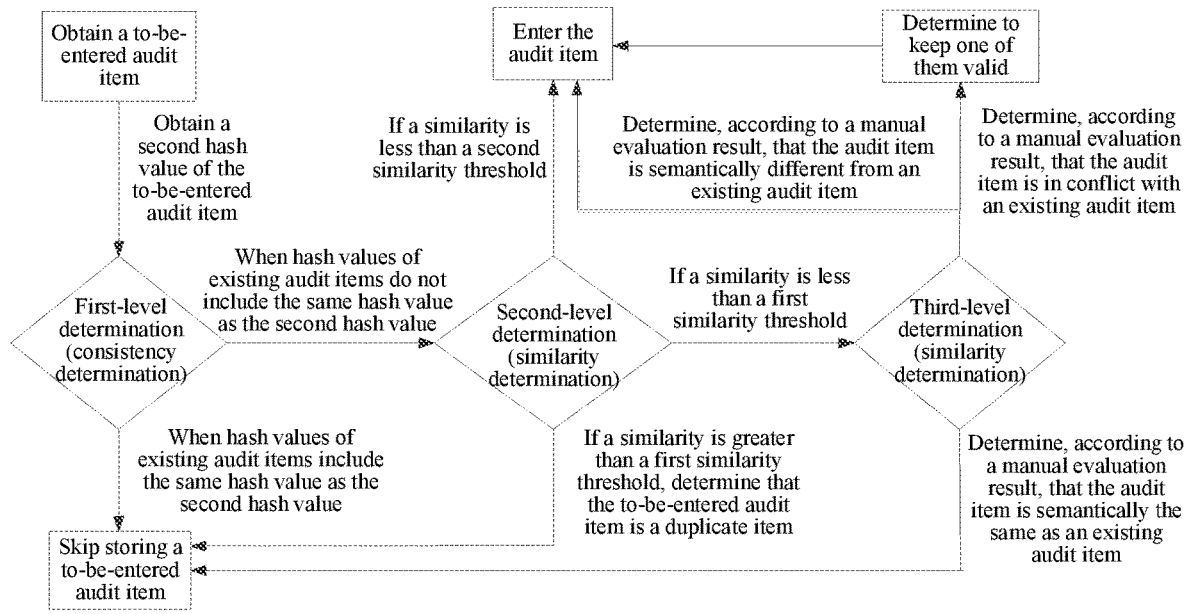
FIG. 3A is a schematic diagram of an entry process of an audit item according to an embodiment of this application.

In this storage method, because the same data has the same hash value, for the same auditing domain, the query and comparison based on this type of hash value may not repeatedly enter the same or extremely similar audit items, thereby reducing storage load of the system, and greatly reducing the redundancy of the audit item. In one embodiment, if hash values of existing audit items in an auditing domain to which the to-be-stored audit item belongs do not include the same hash value as the second hash value, when the existing audit items include an audit item whose similarity with the to-be-stored audit item is greater than a first similarity threshold, it is determined that the to-be-stored audit item is a duplicate item, and the to-be-stored audit item is not stored; when the existing audit items include an audit item whose similarity with the to-be-stored audit item is less than a second similarity threshold, the to-be-stored audit item is entered into the audit items; and when the existing audit items include an audit item whose similarity with the to-be-stored audit item is less than the first similarity threshold, whether to store the to-be-stored audit item is determined according to a manual evaluation result. The similarity may be determined based on semantic analysis. In the absence of the same hash value, further analysis of the audit item is required so as to avoid repeated entry of audit items with the same semantics but different language expressions. Therefore, semantic analysis can be used for obtaining similarities between the existing audit items and the to-be-stored audit item. If the similarity is less than the first similarity threshold, the to-be-stored audit item may have the same semantics as an existing audit item. Therefore, the audit item storage subsystem 100 may provide the to-be-stored audit item and the audit item predicted to have the same semantics for a system administrator or a current user for a manual evaluation, and whether to enter the audit item is determined based on the manual evaluation result (as shown in FIG. 3A). When it is determined, according to the manual evaluation result, that the audit item is semantically different from the existing audit item, the audit item is entered. For the same auditing domain, there may also be conflicts among audit items. Therefore, it is also possible to determine whether the to-be-stored audit item is in conflict with an existing audit item based on a similarity between the audit items. Once there is a conflict, a manual evaluation needs to be submitted to determine how to deal with the conflicting audit items.

For an audit item A and an audit item B in the same auditing domain, if the audit item A specifies that a data retention period is greater than 5 years, and the audit item B specifies that a data retention period is less than 5 years, the audit item A can be considered in conflict with the audit item B. Referring to FIG. 3A, when it is determined, according to the manual evaluation result, that the audit item is in conflict with the existing audit item, based on a manual selection, a to-be-retained audit item can be determined, and the to-be-stored audit item is not entered; or the to-be-stored audit item is entered but the existing audit item is deleted; and when it is determined, according to the manual evaluation result, that the audit item is semantically different from and in conflict with the existing audit item, the to-be-stored audit item is entered. The foregoing entry method avoids repeated audits caused by the same audit items, thereby greatly reducing costs and improving audit efficiency.

Figure 3B:
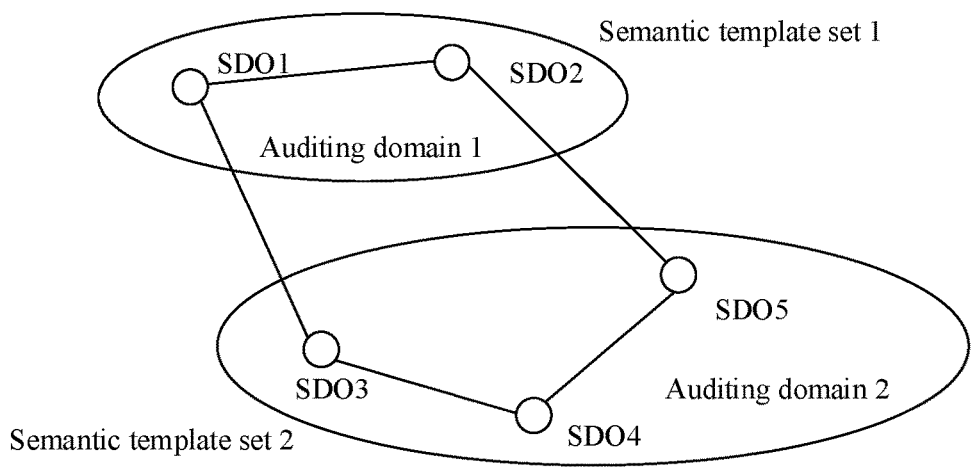
FIG. 3B is a schematic diagram of a relationship between an auditing domain and a semantic template according to an embodiment of this application.

The foregoing obtaining, through semantic analysis, the similarity between the existing audit item and the to-be-stored audit item may be performed based on a preset semantic template set. A semantic template set may be a set of a plurality of semantic templates, and each semantic template may be generated based on a certain standard or specification (for example, an audit standard), and is associated with at least one piece of metadata. An auditing domain can correspond to at least one semantic template set. When formulating and publishing standards, a plurality of standard development organizations (SDO) can divide the published standards into a plurality of auditing domains according to relevance. For example, as shown in FIG. 3B, SDO1 and SDO2 belong to an auditing domain 1, the auditing domain 1 corresponding to a semantic template set 1, SDO3, SDO4, and SDO5 belong to an auditing domain 2, and the auditing domain 2 corresponding to a semantic template set 2. Semantic templates may be stored in addresses corresponding to hash values of the semantic templates, where the hash values of the semantic templates may be hash values (Mh1 to Mhp shown in FIG. 3C) of metadata associated with the semantic templates.

Figure 3C:
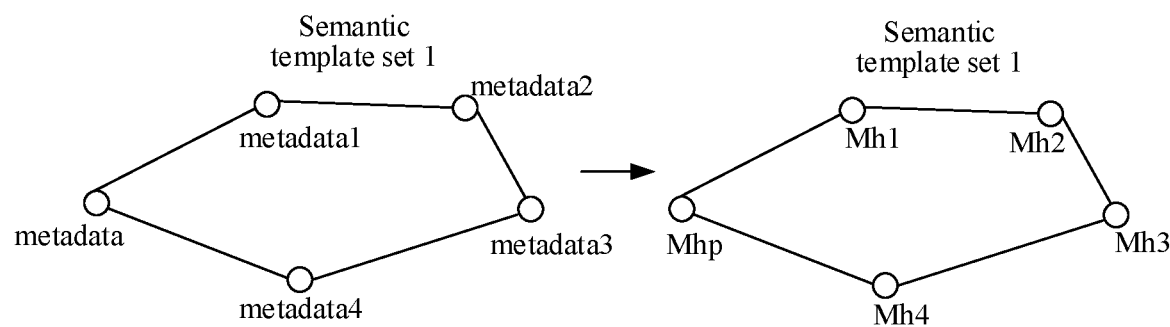
FIG. 3C is a schematic diagram of eigenvalue storage of a semantic template based on metadata according to an embodiment of this application.

In the audit item storage subsystem, matching may be performed, according to an auditing domain to which the to-be-stored audit item belongs, between the to-be-stored audit item and semantic templates in a semantic template set corresponding to the auditing domain. When a corresponding semantic template is obtained through matching based on the to-be-stored audit item, that is, when the matching semantic template set is determined, the matching semantic template can be used for a semantic analysis, and then processes including the foregoing similarity determination can be performed. Further, by matching the audit item with the semantic template, the hash value of the to-be-stored audit item may be associated with the hash value of the matching semantic template, so that audit items with the same or similar semantics are grouped into a set. In this case, diversity based on the semantic template is realized. Audit items associated with the hash value of the semantic template may constitute a stored or displayed data structure (as shown in FIG. 3C), and a manual evaluation may also be submitted to determine retention and deletion of the audit item. Further, when no corresponding semantic template is obtained through matching based on the to-be-stored audit item, a new semantic template can be created, for example, by manual intervention.

Taking the Inter-Planetary File System (IPFS) used in the audit item storage subsystem as an example, in the IPFS, addressing and storage can be performed based on the hash value of the audit item. Therefore, each audit item has a unique hash value, so that by comparing the hash value of the to-be-stored audit item with that of the existing audit item, it is possible to determine whether entry can be directly performed. When it is determined to enter the to-be-stored audit item, a target storage address may be determined based on the hash value of the to-be-stored audit item, and the to-be-stored audit item is stored in the target storage address.

When the entry of the audit item is performed, the entry targets not only at one auditing domain, which may include a plurality of audit objects, but also at a specific audit object. For example, for a certain audit object, based on specifications or standards, a plurality of audit items associated with the audit object are entered. Certainly, the entry of the audit item may also be a non-targeted entry, which is not specifically limited in this embodiment of this application. In some embodiments, when the audit item storage subsystem 100 stores the audit item, the audit item can be stored in association with the audit object, so that the auditor, when performing an audit, can obtain the audit item stored in association with the audit object by retrieving the audit object, thereby improving processing efficiency, for example, a plurality of audit items A1, B1, and C1 can be associated with an audit object 1 by default. Certainly, the audit item storage subsystem 100 may alternatively not store the audit item in association with the audit object, which is not specifically limited in this embodiment of this application either.

The foregoing determination process between the to-be-stored audit item and the existing audit items in the auditing domain to which the to-be-stored audit item belongs can be implemented through a smart contract.

The on-site audit subsystem 101 is used for auditing. The on-site audit subsystem 101 can be used for providing an audit interface for the auditor to perform operations on site. The on-site audit subsystem 101 includes an audit object subsystem. In the audit object subsystem, an audited party inputs one or more audit objects in accordance with an audit template and each audit object can be associated with one or more relevant audit items based on the audit item storage subsystem 100. The audited party provides evidence for an association between the audit item and the audit object. Based on the evidence provided, the auditing party may choose to provide a conformity determination score on site or remotely, to form an audit result of each audit item associated with the audit object. The audited party may provide relevant evidence through the audit object subsystem. In some embodiments, the on-site audit subsystem 101 can store audit-related data of a served service entity, for example, in the form of a database, so as to conduct the foregoing on-site or remote audit. This form of local storage can avoid data leakage and ensure security and confidentiality.

The at least one electronic device 102 can be used as an audit client. For example, an audit client can be run on the electronic device and can be installed on any electronic device, such as a portable electronic device like a mobile phone, a tablet computer, or a specialized audit device. The electronic device 102 may be provided with a trusted execution environment (TEE) or a trusted application (TA) to store a private key of a user and perform operations such as signing. For the audit client, when any user successfully registers in the audit system, the audit system can generate a pair of keys for the user, including a public key and a private key. The public key can be distributed to devices in the audit system for performing steps such as signature verification, and the private key can be stored in the TEE or the TA of the electronic device 102, so that when necessary, the electronic device can interact with the TEE or the TA to perform steps such as signing. The private key cannot be exported out of the TEE or the TA, thereby greatly improving security. The TEE or the TA of the electronic device 102 may store a private key of a logged-in user, and when the user logs out, the private key thereof may be retained or deleted. When any user logs in on the audit client, generation of the keys or transmission of the private key may be reapplied for to the audit system, so that the TEE or the TA of the electronic device can obtain the private key to ensure subsequent data security.

Figure 4:
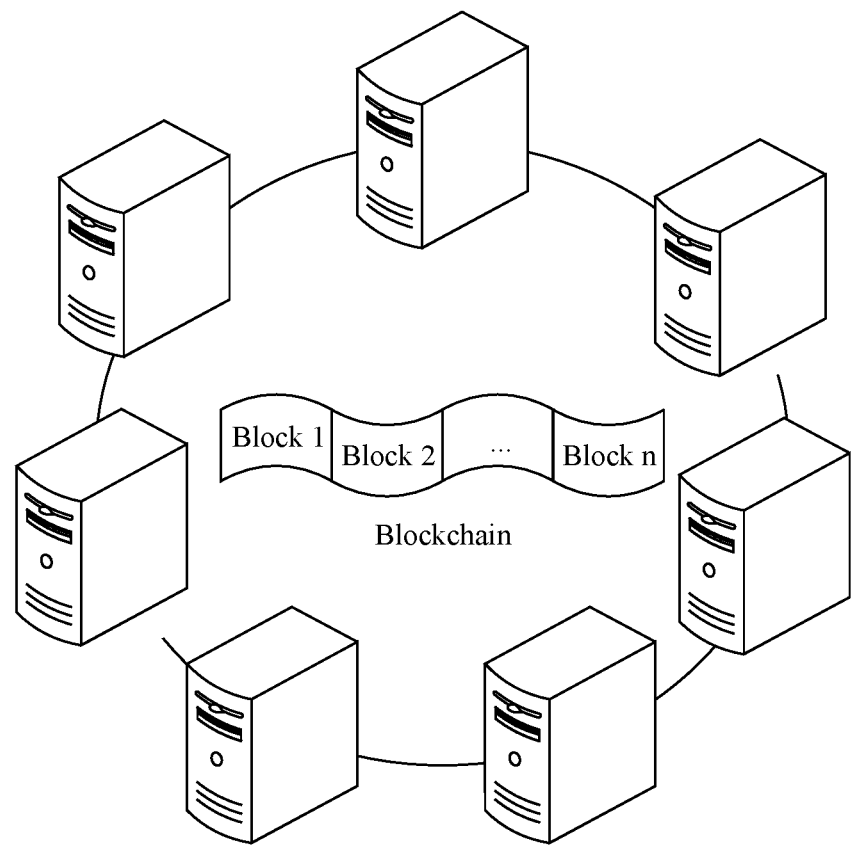
FIG. 4 is a schematic structural diagram of an audit result data storage subsystem 103 according to an embodiment of this application.

The audit result data storage subsystem 103 is used for storing audit result data. The storage may be carried out in the form of a blockchain, that is, the audit result data storage subsystem 103 may include a plurality of node devices (as shown in FIG. 4), and the node devices may serve different service entities respectively. Storage in the form of the blockchain means that data stored on each node device cannot be tampered with.

In the foregoing system, to achieve audit security and data confidentiality, each user needs to register, such as the audited party or the auditing party. Both the audited party and the auditing party can register at least one account so as to be used by their own audit participants. For example, when using the audit client, personnel of the audited party need to first complete registration and select a name of an institution to which the personnel belong. If the relevant institution has not registered, the institution registration needs to be further completed; and after the personnel registration of an audited institution is completed, the audit client obtains a corresponding public-private key pair (pk1, sk1). When using the audit client, the auditor needs to first complete registration and select an audit institution to which the auditing party belongs. If the relevant audit institution has not registered, the registration of the audit institution needs to be further completed; and after the registration of the auditor of the audit institution is completed, the audit client obtains a corresponding public-private key pair (pk2, sk2).

Figure 5:
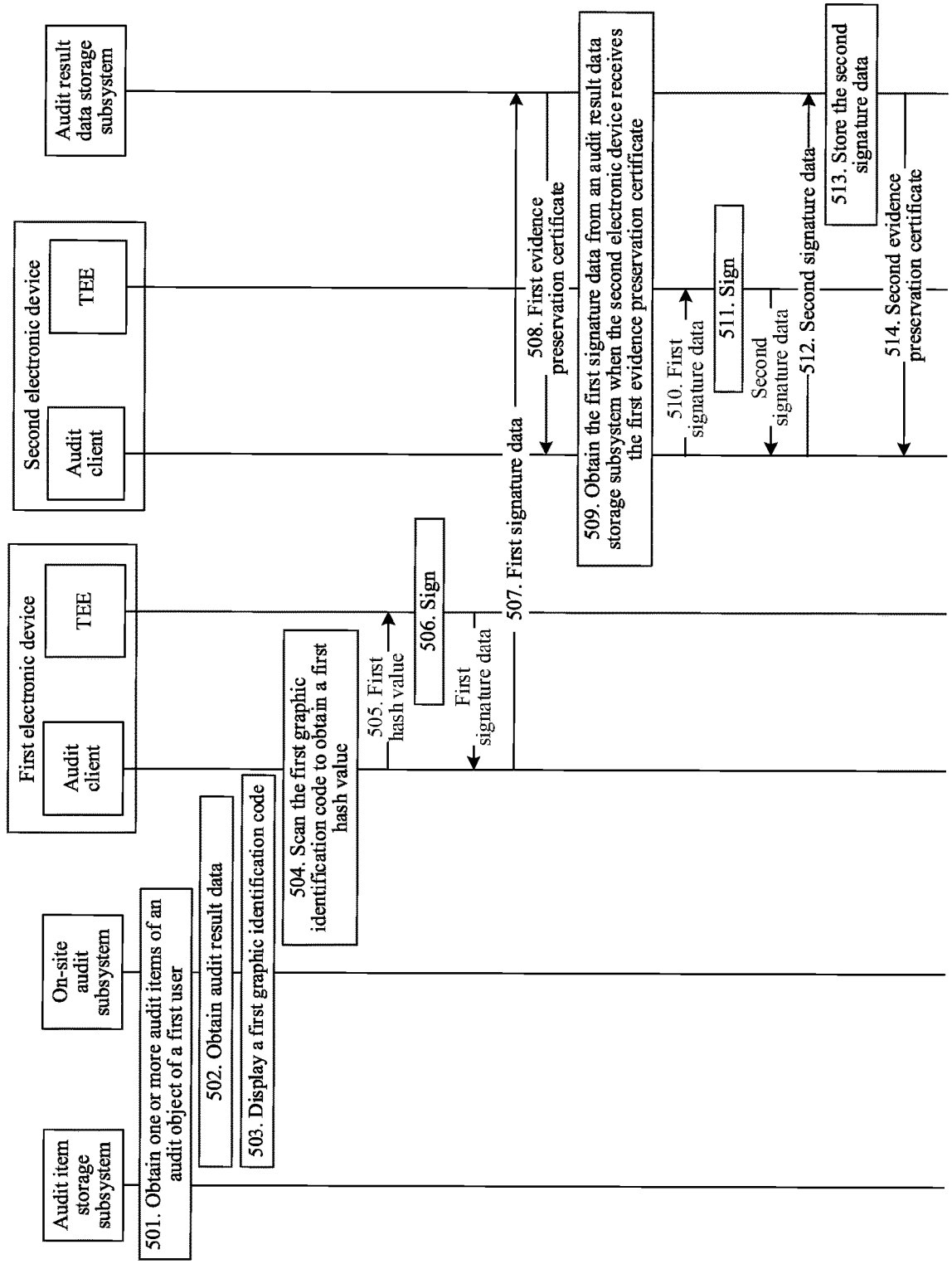
FIG. 5 is a flowchart of an audit result data storage method according to an embodiment of this application.

FIG. 5 is a flowchart of an audit result data storage method according to an embodiment of this application. Referring to FIG. 5, the embodiment relates to a first user as an audited party and a second user as an auditing party, and in an exemplary embodiment, the audit result data storage method includes:

501. Obtain one or more audit items of an audit object of a first user through an interaction between an on-site audit subsystem and an audit item storage subsystem.

An auditor can operate in the on-site audit subsystem to input the audit object, and the on-site audit subsystem can establish a data connection with the audit item storage subsystem, so as to obtain, according to the audit object, one or more audit items associated with the audit object from the audit item storage subsystem. Certainly, the one or more audit items may be default association items of the audit object, and the auditor can adjust the default association items according to actual audit requirements (for example, deleting or adding an audit item). The one or more audit items may alternatively be one or more audit items obtained by the auditor from the audit item storage subsystem based on actual audit requirements, which is not limited in this embodiment of this application.

502. Perform an audit based on the one or more audit items of the audit object in the on-site audit subsystem to obtain audit result data.

An audit result of each audit item in the audit result data includes a hash value of the audit item, a hash value of an eigenvalue of the first user, and a hash value of audit evidence. Because of irreversibility of a hash value, data transmission based on the hash value can ensure that original audit data is not leaked. Using the hash value being obtained based on a hash algorithm as an example, a hash value of the audit item is Hash (L), a hash value of the eigenvalue of the audit object is Hash (O), and a hash value of the evidence provided by the audited party is Hash (E). In some embodiments, the audit result of the each audit item in the audit result data further includes at least one of the following: a hash value of an audit context, a hash value of an eigenvalue of the second user, a hash value of second user information, and a hash value of first user information. That is, the audit item may further include a hash value Hash (Con) of the audit context, a hash value Hash (D) of the eigenvalue of the auditing party, a hash value Hash (A) of basic information of the auditing party, and a hash value Hash (O) of basic information of the audited party.

The first user information may be institution information, an institution code or the like of the first user, and the second user information may be institution information, an institution code or the like of the second user. Certainly, the user information may also include the user's own employee number or the like, which is not limited in this embodiment of this application. The audit context refers to information related to the current audit, such as a location and time of the audit.

The foregoing audit may be performed by an auditor in the on-site audit subsystem, or may be performed by an auditor who accesses remotely, which is not limited in this embodiment of this application.

503. The on-site audit subsystem displays a first graphic identification code according to a first hash value of audit result data, the first graphic identification code being used for indicating the audit result data.

The on-site audit subsystem generates, based on the audit result data, a first hash value of the audit result data. Before the first hash value is generated, the audit items in the audit result data can be combined to form a new data block, and then hash processing is performed to obtain the first hash value. The on-site audit subsystem then generates, based on the first hash value, a first graphic identification code, and displays the code on a screen of the on-site audit subsystem. The first graphic identification code may be a two-dimensional barcode such as a quick response (QR) code.

The first graphic identification code may also identify a second user as the auditing party, so that in a subsequent process, other devices can learn about personnel performing the audit on site.

504. The first electronic device obtains, by scanning the first graphic identification code, the first hash value indicated by the first graphic identification code.

The first electronic device refers to a device on which the first user of the audited party logs in, and staff of the audited party can obtain, by the code scanning method, the first hash value and store the first hash value on the first electronic device. This data transmission method based on a graphic identification code is not only simple and convenient in operation, but also greatly improves intuitiveness and credibility of the entire transmission.

Steps 503 and 504 are described by using an example in which data transmission is performed in a code scanning mode, but for the on-site audit subsystem and the first electronic device, data transmission is performed in other data transmission methods such as Bluetooth or LAN connection instead of the code scanning mode, which are not limited in this embodiment of this application.

505. The first electronic device transmits the first hash value to a trusted execution environment of the first electronic device.

In step 505, signing may be performed based on authorization, that is, when the first user approves the audit result data, the first electronic device can authorize the signing of the audit result data to indicate that the audited party approves the audit result. When the first user does not approve the audit result data, the signing may not be authorized.

A private key of the first user is stored in the trusted execution environment of the first electronic device. To achieve data security, the first electronic device may transmit the first hash value to the trusted execution environment for signing instead of obtaining the private key and self-signing. In one embodiment, the first electronic device may transmit a signing instruction to the trusted execution environment. The signing instruction carries a client identifier and the first hash value to identify which private key needs to be used to sign the hash value.

506. The trusted execution environment signs the first hash value according to the private key of the first user to obtain first signature data, and transmits the first signature data to the first electronic device.

In step 506, the trusted execution environment may obtain the private key of the first user, and then use the private key to sign the first hash value. In one embodiment, the trusted execution environment may verify the client identifier carried in the signing instruction; and when trusted client identifiers include the client identifier, obtain the private key corresponding to the client identifier and execute the signing instruction.

507. The first electronic device, after receiving the first signature data, transmits the first signature data to an audit result data storage subsystem, the audit result data storage subsystem being configured to store audit result data. The audit result data storage subsystem is configured to store data in the form of a blockchain.

For the signed first hash value, the first electronic device may transmit the first signature data to the audit result data storage subsystem to determine that the audited party has approved the audit result.

508. The audit result data storage subsystem, after receiving the first signature data, transmits a first evidence preservation certificate to a second electronic device, the first evidence preservation certificate being used for indicating that the first signature data has been stored in the audit result data storage subsystem.

In some embodiments, the audit result data storage subsystem may alternatively return the first evidence preservation certificate to the first electronic device, so as to inform the first electronic device that storage is completed. Certainly, the audit result data storage subsystem may alternatively return a progress description to the first electronic device to inform the first electronic device that signing of this stage has been completed, and signing of the second user is required to complete data storage.

The audit result data storage subsystem, after receiving the first signature data, may verify the first signature data. The verification may be performed based on the public key of the first user. When the verification succeeds, the transmitting step of the first evidence preservation certificate in step 508 and subsequent processes are then performed.

509. Obtain the first signature data from the audit result data storage subsystem when the second electronic device receives the first evidence preservation certificate.

In step 509, the obtaining the first signature data from the audit result data storage subsystem may be receiving the first signature data transmitted by the audit result data storage subsystem, or be that the second electronic device actively obtains the first signature data corresponding to the first evidence preservation certificate from the audit result data storage subsystem, which is not limited in this embodiment of this application.

510. The second electronic device transmits the first signature data to a trusted execution environment of the second electronic device.

511. The trusted execution environment signs the first signature data according to the private key of the second user to obtain second signature data, and transmits the second signature data to the second electronic device.

512. The second electronic device, after receiving the second signature data, transmits the second signature data to the audit result data storage subsystem, the audit result data storage subsystem being configured to store data in the form of a blockchain.

Steps 510 to 512 are similar to the processes of signing and transmitting performed by the first electronic device.

513. The audit result data storage subsystem stores the second signature data.

The second signature data is data signed by the first user and the second user. Dual signatures of the auditing party and the audited party can greatly improve data security and that the audit result data is stored in the form of a blockchain can avoid data leakage while ensuring that the audit result is true and valid.

514. After storage is completed, the audit result data storage subsystem transmits a second evidence preservation certificate to the second electronic device, the second evidence preservation certificate being used for indicating that the second signature data has been stored in the audit result data storage subsystem.

In some embodiments, the audit result data storage subsystem may alternatively return the second evidence preservation certificate to the first electronic device, so as to inform the first electronic device that storage is completed.

Figure 6:
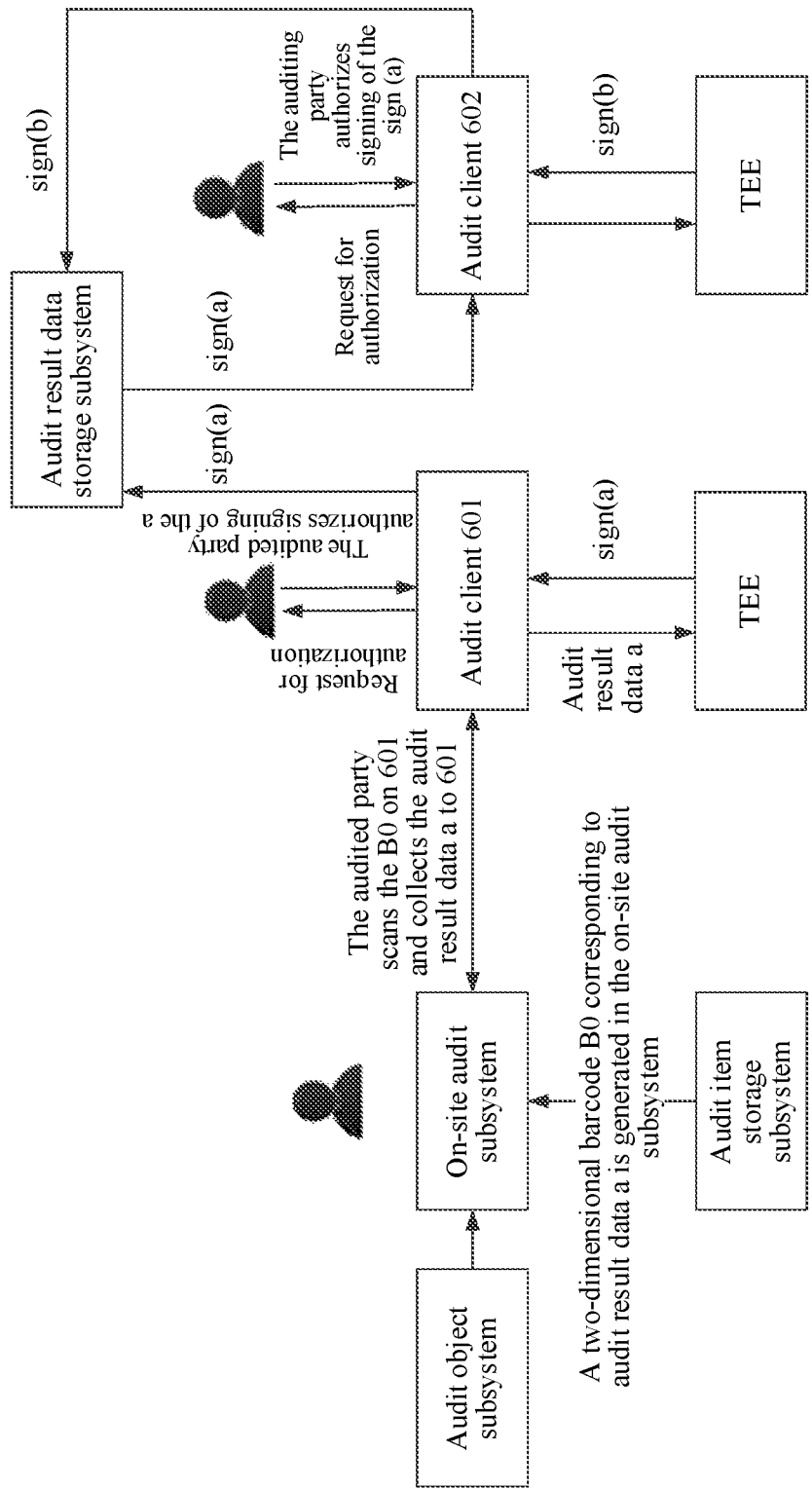
FIG. 6 is a flowchart of an example of an audit result data storage method according to an embodiment of this application.

To show the foregoing data transmission process more clearly, the following is a brief description of the embodiment provided in FIG. 5 based on an example. Referring to FIG. 6, after audit result data a is generated, a two-dimensional barcode B0 corresponding to the audit result data a is generated in the on-site audit subsystem. The audited party may log in on an audit client 601 and choose to use a code scanning mode to scan the B0, collect an audit result a to the audit client, and authorize signing of the audit result a. The signing can be implemented by the TEE of the audit client. First signature data obtained by signing of the TEE using the foregoing private key sk1 can be denoted as Sign (a), and Sign (a) is transmitted to the audit result data storage subsystem. The audit result data storage subsystem transmits Sign (a) to an audit client 602 on which the second user logs in. The second user authorizes signing of Sign (a) on the audit client 602 to obtain Sign (b), and transmits Sign (b) to the audit result data storage subsystem for storage.

The foregoing storage method does not perform actual transmission of the audit result data, but stores, after the hash value of the audit result data is signed by a plurality of parties, the hash value in the audit result data storage subsystem, thereby greatly reducing possibility of data leakage and providing security assurance for sensitive information.

Figure 7:
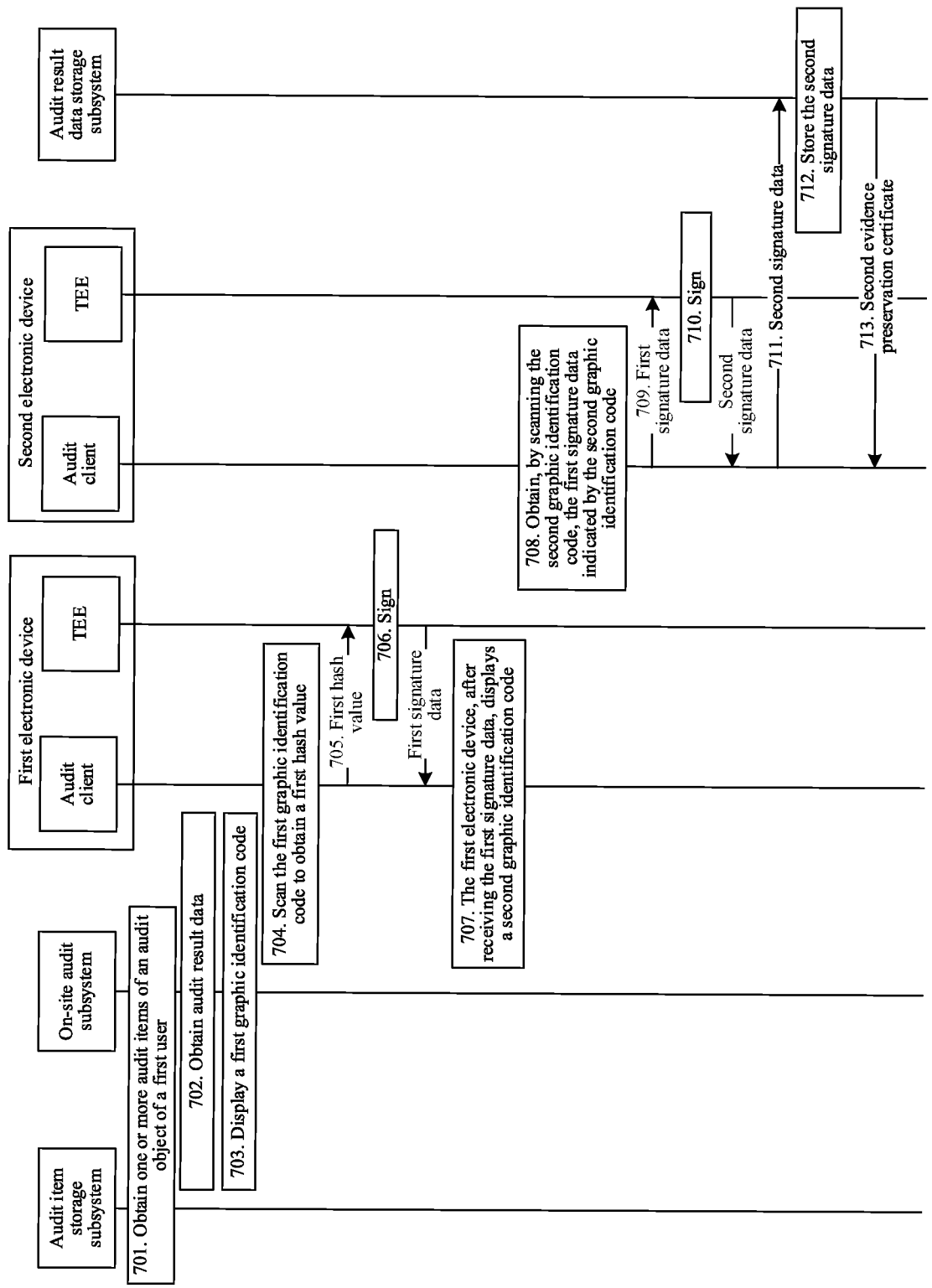
FIG. 7 is a flowchart of an audit result data storage method according to an embodiment of this application.

The embodiment shown in FIG. 5 explains an example of the first user and the second user performing signing based on data transmission of the audit result data storage subsystem. The embodiment shown in FIG. 7 shows a process of describing an example of the first user and the second user performing data transmission based on a graphic identification code, so as to perform signing. Referring to FIG. 7, the embodiment specifically includes:

701. Obtain a plurality of audit items of an audit object of a first user through an interaction between an on-site audit subsystem and an audit item storage subsystem.

702. Perform an audit based on the plurality of audit items of the audit object in the on-site audit subsystem to obtain audit result data.

703. The on-site audit subsystem displays a first graphic identification code according to a first hash value of audit result data, the first graphic identification code being used for indicating the audit result data.

704. The first electronic device obtains, by scanning the first graphic identification code, the first hash value indicated by the first graphic identification code.

705. The first electronic device transmits the first hash value to a trusted execution environment of the first electronic device.

706. The trusted execution environment signs the first hash value according to the private key of the first user to obtain first signature data, and transmits the first signature data to the first electronic device.

The foregoing steps 701 to 706 are similar to steps 501 to 506.

707. The first electronic device, after receiving the first signature data, displays a second graphic identification code, the second graphic identification code being used for indicating the first signature data.

Staff of the audited party can select the code scanning mode on the first electronic device, so that staff of the auditing party can obtain the first signature data by code scanning in a face-to-face manner, and the operation is simple and intuitive.

708. The second electronic device obtains, by scanning the second graphic identification code, the first signature data indicated by the second graphic identification code.

The second electronic device refers to a device on which the second user of the auditing party logs in, and staff of the auditing party can obtain, by the code scanning method, the first signature data and store the first signature data on the second electronic device. This data transmission method based on a graphic identification code is not only simple and convenient in operation, but also greatly improves intuitiveness and credibility of the entire transmission.

The foregoing steps are described by using an example in which data transmission is performed in a code scanning mode, but for the first electronic device and the second electronic device, data transmission is performed in other data transmission methods such as Bluetooth or LAN connection instead of the code scanning mode, which are not limited in this embodiment of this application.

709. The second electronic device transmits the first signature data to a trusted execution environment of the second electronic device.

710. The trusted execution environment signs the first signature data according to the private key of the second user to obtain second signature data, and transmits the second signature data to the second electronic device.

711. The second electronic device, after receiving the second signature data, transmits the second signature data to an audit result data storage subsystem, the audit result data storage subsystem being configured to store audit result data.

712. The audit result data storage subsystem stores the second signature data.

713. After storage is completed, the audit result data storage subsystem transmits a second evidence preservation certificate to the second electronic device, the second evidence preservation certificate being used for indicating that the second signature data has been stored in the audit result data storage subsystem.

Steps 709 to 713 are similar to steps 510 to 514.

Figure 8:
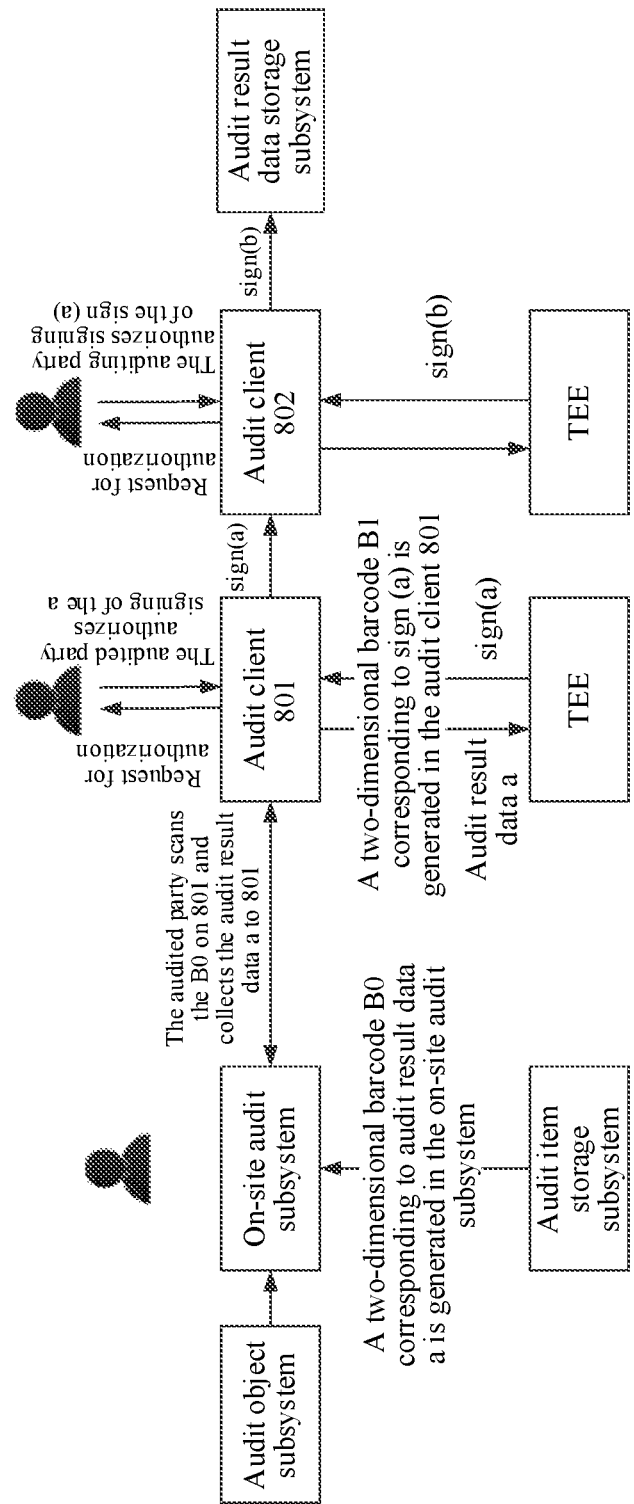
FIG. 8 is a flowchart of an example of an audit result data storage method according to an embodiment of this application.

To show the foregoing data transmission process more clearly, the following is a brief description of the embodiment provided in FIG. 7 based on an example. Referring to FIG. 8, after audit result data a is generated, a two-dimensional barcode B0 corresponding to the audit result data a is generated in the on-site audit subsystem. The audited party may log in on an audit client 801 and choose to use a code scanning mode to scan the B0, collect an audit result a to the audit client 801, and authorize signing of the audit result a. The signing can be implemented by the TEE of the audit client. First signature data obtained by signing of the TEE using the foregoing private key sk1 can be denoted as Sign (a). After Sign (a) is generated, a two-dimensional barcode B1 corresponding to Sign (a) is generated in the audit client. In the audit client, the auditing party can be associated with the audited party, and the auditing party can choose to use the code scanning mode to collect Sign (a) data corresponding to an audit result B1 to an audit client 802. The second user authorizes signing of Sign (a) on the audit client 802 to obtain Sign (b), and transmits Sign (b) to the audit result data storage subsystem for storage.

The foregoing storage method does not perform actual transmission of the audit result data, but stores, after the hash value of the audit result data is signed by a plurality of parties, the hash value in the audit result data storage subsystem, thereby greatly reducing possibility of data leakage and providing security assurance for sensitive information.

Figure 9:
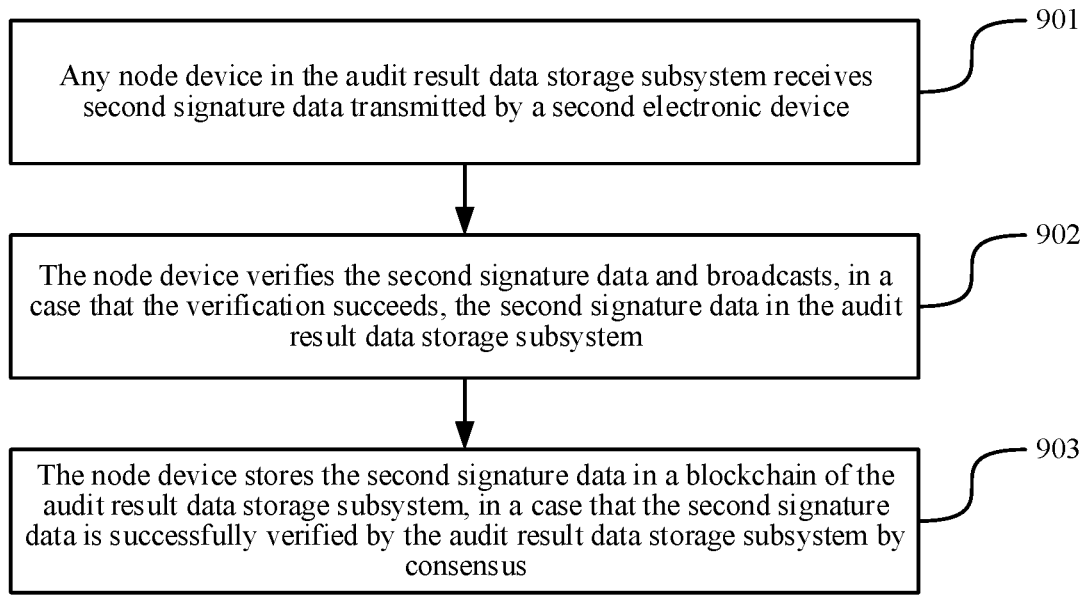
FIG. 9 is a flowchart of an audit result data storage method according to an embodiment of this application.

The audit result data storage subsystem can store data in the form of a blockchain. A storage process is illustrated in FIG. 9 below, and this process can be applied to the foregoing process of FIG. 5 or FIG. 7.

901. Any node device in the audit result data storage subsystem receives second signature data transmitted by a second electronic device, the second signature data being used for indicating a first hash value signed by a first user as an audited party and a second user as an auditing party, the first hash value being used for indicating audit result data of the first user.

902. The node device verifies the second signature data and broadcasts, in a case that the verification succeeds, the second signature data in the audit result data storage subsystem.

For any node device, the node device stores public keys of users for identity verification. Therefore, step 902 may specifically include: verifying the second signature data based on a public key of the first user and a public key of the second user.

The verification may include decrypting the second signature data by using the public key of the second user and the public key of the first user to obtain the first hash value. If the decryption is successful, the verification succeeds, and if the decryption is unsuccessful, the verification fails.

903. The node device stores the second signature data in a blockchain of the audit result data storage subsystem, in a case that the second signature data is successfully verified by the audit result data storage subsystem by consensus.

Any node device can receive the second signature data broadcast by the node device in step 902, and verify the second signature data. If the verification succeeds, the node device can broadcast a verification success message, and node devices can determine, based on the received verification success message, whether the second signature data is successfully verified by consensus, which is not limited in this embodiment of this application. Certainly, the foregoing consensus process is only an exemplary description. For systems that use other consensus mechanisms, there may also be other consensus methods, which are not limited in this embodiment of this application.

Storing signature data in the form of a blockchain can prevent the data from being tampered with while ensuring security of data, and because data processing efficiency of the blockchain is high, efficiency of query can also be improved.

In some embodiments, during storage, the second signature data can be stored in association with stored data of the first user in the blockchain for easy query. Any of the following methods can be used in associative storage: in one embodiment, the hash value corresponding to the audited party included in the second signature data can be used to obtain stored data of the audited party in the blockchain. A new block can be generated based on the second signature data and the stored data of the audited party. In the new block, a Merkle tree is used to record a historical audit situation of the audited party. The method of storage in the form of blocks can be performed every time the second signature data is received. In another possible implementation, node devices may maintain a corresponding Merkle tree for each first user, and update the Merkle tree corresponding to the each first user based on the signature data successfully verified by consensus. This process may be performed every time the second signature data is received, or may be performed when a block height reaches a certain value, which is not limited in this embodiment of this application. In some embodiments, storage of the foregoing Merkle tree may be implemented by a container.

Figure 10:
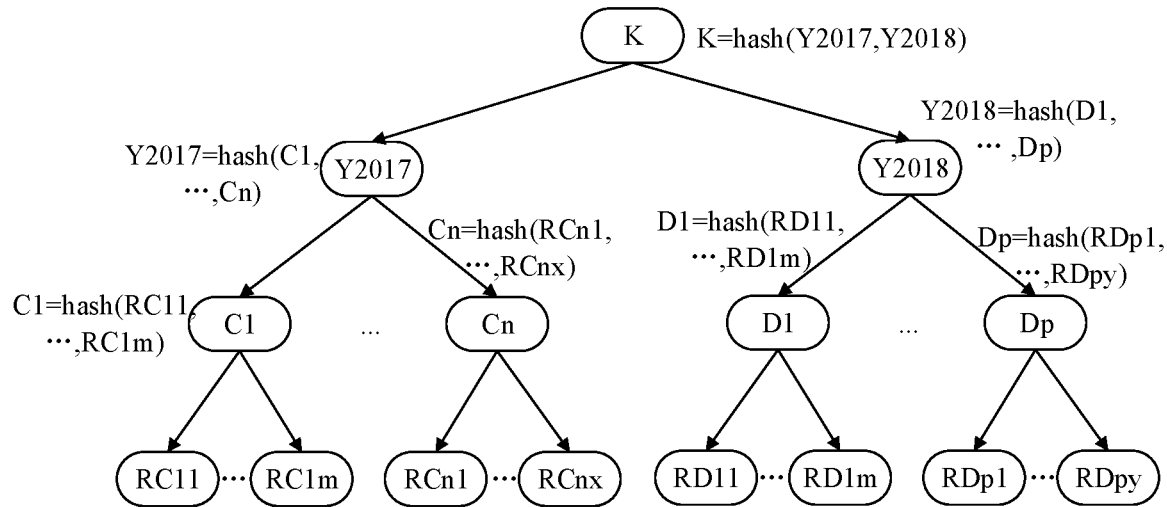
FIG. 10 is a diagram of an example of a Merkle tree according to an embodiment of this application.

For an example of the Merkle tree, referring to FIG. 10, an audited party K company conducted p audits in 2018 and n audits in 2017.

The n audits in 2017 are denoted as C1 to Cn. When there are m audit items involved in the audit C1, hash values of audit results corresponding to the audit items are RC11, RC12, ..., RC1m; then the hash values of the audit results of the audit items of the audit C1 can be combined and hashed, and a hash value of an audit result corresponding to the audit C1 is obtained as C1=hash (RC11, RC12, ..., RC1m). When there are x audit items involved in the audit Cn, hash values of audit results corresponding to the audit items are RCn1, RCn2, ..., RCnx; then the hash values of the audit results of the audit items of the audit Cn can be combined and hashed, and a hash value of an audit result corresponding to the audit Cn can be obtained as Cn=hash (RCn1, RCn2, ..., RCnx).

The p audits in 2018 are denoted as D1 to Dp. When there are y audit items involved in the audit Dp, hash values of audit results corresponding to the audit items are RDp2, RDp2, ..., RDpy; then the hash values of the audit results of the audit items of the audit Dp can be combined and hashed, and a hash value of an audit result corresponding to the audit Dp is obtained as Dp=hash (RDp1, RDp2, ..., RDpy).

After the hash values of the n audits involved in 2017 are combined, (C1, ..., Cn) is obtained, and hash is performed again to generate a hash value Y2017=hash (C1, ..., Cn); after the hash values of the p audits involved in 2018 are combined, (D1, ..., Dp) is obtained, and hash is performed again to obtain a hash value Y2018=hash (D1, ..., Dp); and the audit result of Merkle root of the K company is a hash value K=hash (Y2017, Y2018) obtained by combining the hash values Y2017 and Y2018 in the years and then performing hash.

In some embodiments, using the foregoing associative storage, the query of the audit result data is faster. Such a query includes the following steps: the audit result data storage subsystem generates a query page of a third user based on data corresponding to the third user in the audit result data storage subsystem, the query page of the third user including an audit result of the third user. The data corresponding to the third user includes an historical audit result of the third user. Because signature data used for indicating the audit result of the third user is stored in the audit result data storage subsystem after each audit of the third user, and a method of associative storage is used in each storage, data obtained by audits of the third user is associative. Therefore, when the query page of the third user is generated, the audit results chronologically associated can be generated according to a time relationship among the signature data. For example, the audit result of the third user includes audit result items divided by at least one of the following: year, half a year, quarter, and month. Using the Merkle tree shown above as an example, the query page may include audit result items by year, and audit result items by quarter are further mounted under each audit result item by year, and the like, which is not limited in this embodiment of this application. An inquirer can have a check based on any audit result item and can trigger a check instruction by clicking on the audit result item to jump to an information page of the audit result item, which is not limited in this embodiment of this application.

Indeed the foregoing display of the query page can be implemented based on the graphic identification code, that is, the audit result data storage subsystem. When receiving a page query request, the audit result data storage subsystem can use the graphic identification code to provide a page link address of the query page by using information such as the hash value of the eigenvalue of the audited user carried in the page query request as a query index. When the inquirer accesses the page link address, the query page can be displayed on an access device of the inquirer. In one embodiment, the query process may alternatively be based on a query index other than the hash value of the eigenvalue of the audited user. For example, the process may be based on the hash value of the eigenvalue of the auditing party, or based on the hash value of audit context information, which is not limited in this embodiment of this application.

In one embodiment, the third electronic device may obtain the page link address of the query page of the third user by scanning a third graphic identification code provided by any electronic device; transmit a web page access request, which is used for accessing the page link address of the query page of the third user; and display the query page of the third user, the query page including the audit result of the third user. The audit result of the third user includes audit result items divided by at least one of the following: year, half a year, quarter, and month. After the query page of the third user is displayed, when a check instruction for any audit result item is received, audit result data corresponding to the audit result item is obtained.

The foregoing data storage method enables a user to be associated with the historical audit results of the user, thereby greatly improving efficiency of the query and making the data more standardized. In addition, by providing the link address of the query page in the form of a graphic identification code, an intuitive and convenient query can also be achieved.

The steps of the embodiments of this application are not necessarily performed according to a sequence indicated by step numbers. Unless explicitly specified in this application, the sequence of the steps is not strictly limited, and the steps may be performed in other sequences. Moreover, at least some of the steps in each embodiment may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some of sub-steps or stages of other steps.

Figure 11:
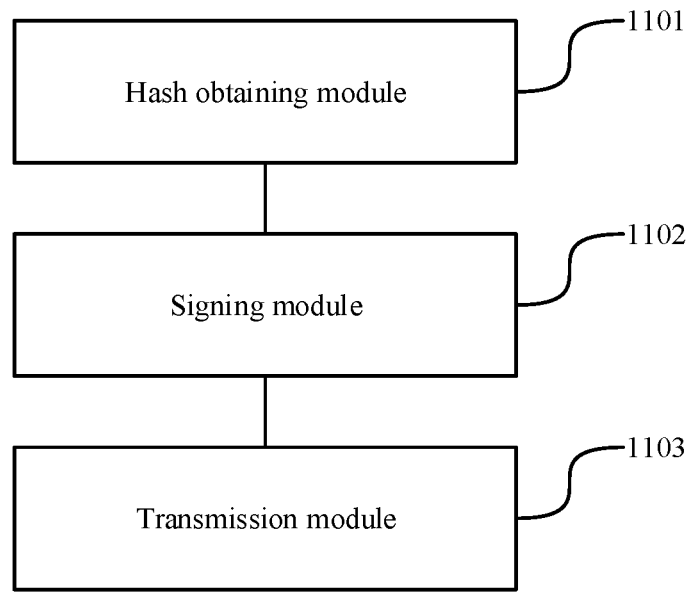
FIG. 11 is a schematic structural diagram of an audit result data storage device according to an embodiment of this application.

FIG. 11 is a schematic structural diagram of an audit result data storage device according to an embodiment of this application. The device is applied to a first electronic device, and includes: a hash obtaining module 1101, configured to obtain a first hash value of audit result data of a first user; a signing module 1102, configured to sign the first hash value according to a private key of the first user to obtain first signature data; and a transmission module 1103, configured to transmit the first signature data to an audit result data storage subsystem, the audit result data storage subsystem being configured to store data in the form of a blockchain.

In one embodiment, the hash obtaining module 1101 is configured to obtain, by scanning a first graphic identification code provided by any electronic device, the first hash value indicated by the first graphic identification code.

In one embodiment, an audit result of each audit item in the audit result data includes a hash value of the audit item, a hash value of an eigenvalue of the first user, and a hash value of audit evidence.

In one embodiment, the audit result of the each audit item in the audit result data further includes at least one of the following: a hash value of an audit context, a hash value of an eigenvalue of a second user, a hash value of second user information, and a hash value of first user information.

In one embodiment, the signing module is configured to: transmit the first hash value to a trusted execution environment of the first electronic device; and receive the first signature data, the first signature data being obtained by signing the first hash value by the trusted execution environment of the first electronic device according to the private key of the first user, the private key of the first user being generated by an audit system after the first user has successfully registered.

In one embodiment, the device further includes: a display module, configured to display a second graphic identification code according to the first signature data, the second graphic identification code being used for indicating the first signature data.

When the audit result data storage device provided in the foregoing embodiments stores audit result data, merely divisions of the foregoing functional modules are used as an example for description. During actual application, the foregoing functions may be allocated to and completed by different functional modules according to requirements, that is, the internal structure of the device is divided into different functional modules, to complete all or some of the foregoing described functions. In addition, the audit result data storage method embodiments provided in the foregoing embodiments belong to one conception. For the specific implementation process, refer to the method embodiments.

Figure 12:
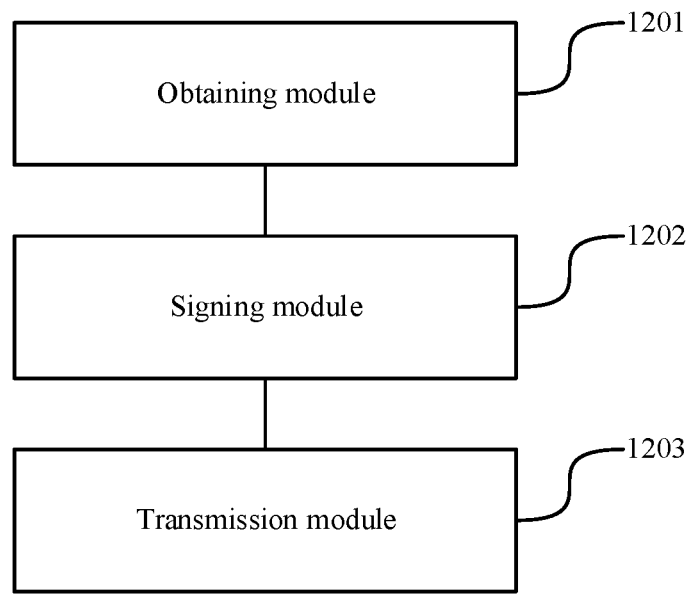
FIG. 12 is a schematic structural diagram of an audit result data storage device according to an embodiment of this application.

FIG. 12 is a schematic structural diagram of an audit result data storage device according to an embodiment of this application. The device is applied to a second electronic device, and includes: an obtaining module 1201, configured to obtain first signature data, the first signature data being used for indicating audit result data of a first user; a signing module 1202, configured to sign the first signature data according to a private key of a second user to obtain second signature data; and a transmission module 1203, configured to transmit the second signature data to an audit result data storage subsystem, the audit result data storage subsystem being configured to store data in the form of a blockchain.

In one embodiment, the signing module is configured to: transmit the first signature data to a trusted execution environment of the second electronic device; and receive the second signature data, the second signature data being obtained by signing the first signature data by the trusted execution environment of the second electronic device according to the private key of the second user, the private key of the second user being generated by an audit system after the second user has successfully registered.

In one embodiment, the obtaining module is configured to obtain, by scanning a second graphic identification code provided by a first electronic device, the first signature data indicated by the second graphic identification code.

In one embodiment, the obtaining module is configured to receive a first evidence preservation certificate of the audit result data storage subsystem, the first evidence preservation certificate being used for indicating that the first signature data has been stored in the audit result data storage subsystem; and obtain the first signature data from the audit result data storage subsystem.

In one embodiment, the device further includes: a receiving module, configured to receive a second evidence preservation certificate of the audit result data storage subsystem, the second evidence preservation certificate being used for indicating that the second signature data has been stored in the audit result data storage subsystem.

When the audit result data storage device provided in the foregoing embodiments stores audit result data, merely divisions of the foregoing functional modules are used as an example for description. During actual application, the foregoing functions may be allocated to and completed by different functional modules according to requirements, that is, the internal structure of the device is divided into different functional modules, to complete all or some of the foregoing described functions. In addition, the audit result data storage method embodiments provided in the foregoing embodiments belong to one conception. For the specific implementation process, refer to the method embodiments.

Figure 13:
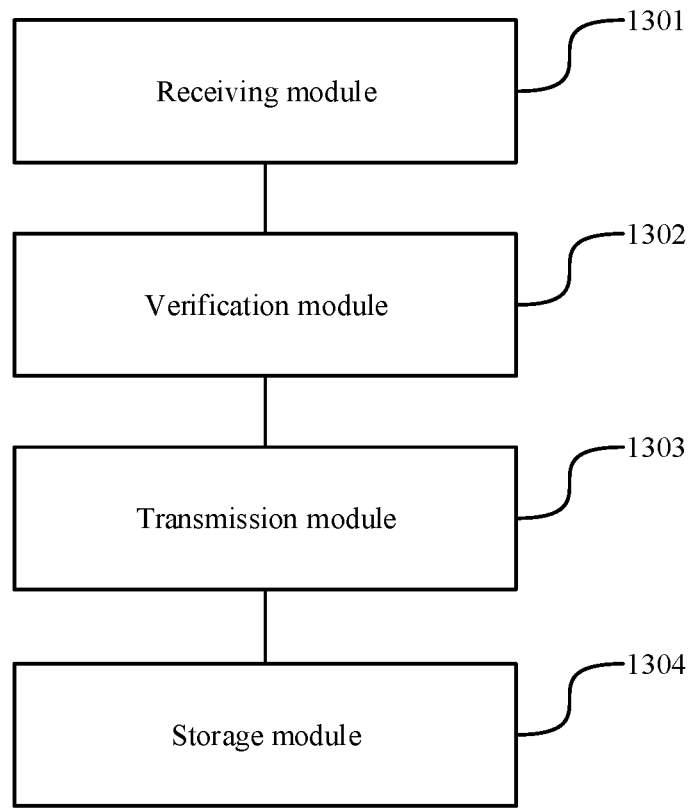
FIG. 13 is a schematic structural diagram of an audit result data storage device according to an embodiment of this application.

FIG. 13 is a schematic structural diagram of an audit result data storage device according to an embodiment of this application. The device is applied to any node device in an audit result data storage subsystem, a plurality of node devices in the audit result data storage subsystem being provided with a consensus mechanism, the device including: a receiving module 1301, configured to receive second signature data transmitted by a second electronic device, the second signature data being used for indicating a first hash value signed by a first user as an audited party and a second user as an auditing party, the first hash value being used for indicating audit result data of the first user; a verification module 1302, configured to verify the second signature data; a transmission module 1303, configured to broadcast the second signature data in an audit result data storage subsystem in a case that the verification succeeds; and a storage module 1304, configured to store the second signature data in the audit result data storage subsystem, in a case that the second signature data is successfully verified by the audit result data storage subsystem by consensus.

In one embodiment, the verification module is configured to verify the second signature data based on a public key of the first user and a public key of the second user.

In one embodiment, the storage module is configured to store the second signature data in association with stored data of the first user in the blockchain.

In one embodiment, the device further includes: a page generation module, configured to generate a query page of a third user based on data corresponding to the third user in the audit result data storage subsystem, the query page of the third user including an audit result of the third user.

In one embodiment, the device further includes: an address providing module, configured to provide a page link address of the query page of the third user in the form of a graphic identification code.

In one embodiment, the receiving module is further configured to receive first signature data transmitted by a first electronic device, and transmit a first evidence preservation certificate to the second electronic device according to the first signature data, the first evidence preservation certificate being used for indicating that the first signature data has been stored in the audit result data storage subsystem.

In one embodiment, the transmission module is further configured to transmit a second evidence preservation certificate to the second electronic device, the second evidence preservation certificate being used for indicating that the second signature data has been stored in the audit result data storage subsystem.

When the audit result data storage device provided in the foregoing embodiments stores audit result data, merely divisions of the foregoing functional modules are used as an example for description. During actual application, the foregoing functions may be allocated to and completed by different functional modules according to requirements, that is, the internal structure of the device is divided into different functional modules, to complete all or some of the foregoing described functions. In addition, the audit result data storage method embodiments provided in the foregoing embodiments belong to one conception. For the specific implementation process, refer to the method embodiments.

Figure 14:
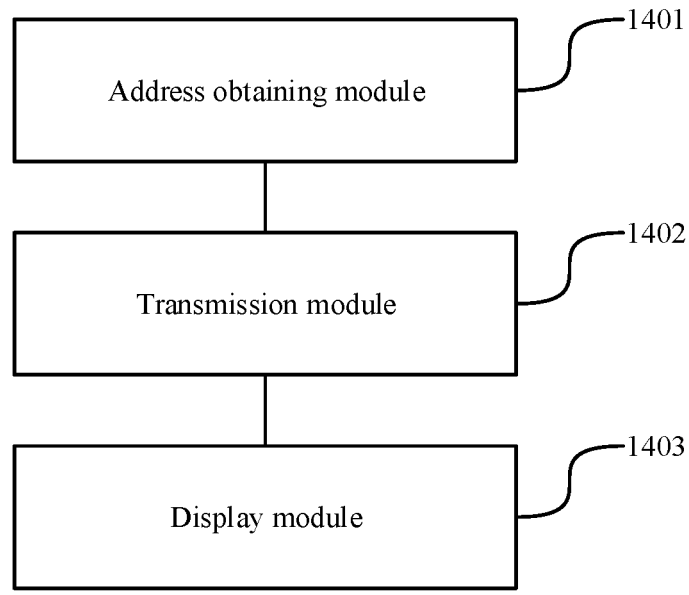
FIG. 14 is a schematic structural diagram of an audit result data query device according to an embodiment of this application.

FIG. 14 is a schematic structural diagram of an audit result data query device according to an embodiment of this application, referring to FIG. 14, the device including: an address obtaining module 1401, configured to obtain a page link address of a query page of a third user by scanning a third graphic identification code provided by any electronic device; a transmission module 1402, configured to transmit a web page access request, the web page access request being used for accessing the page link address of the query page of the third user; and a display module 1403, configured to display the query page of the third user, the query page including an audit result of the third user.

In one embodiment, the audit result of the third user includes audit result items divided by at least one of the following: year, half a year, quarter, and month.

In one embodiment, the device further includes: a data obtaining module, configured to obtain, when a check instruction for any audit result item is received, audit result data corresponding to the audit result item.

When the audit result data query device provided in the foregoing embodiments performs audit result data query, merely divisions of the foregoing functional modules are used as an example for description. During actual application, the foregoing functions may be allocated to and completed by different functional modules according to requirements, that is, the internal structure of the device is divided into different functional modules, to complete all or some of the foregoing described functions. In addition, the audit result data query method embodiments provided in the foregoing embodiments belong to one conception. For the specific implementation process, refer to the method embodiments.

Figure 15:
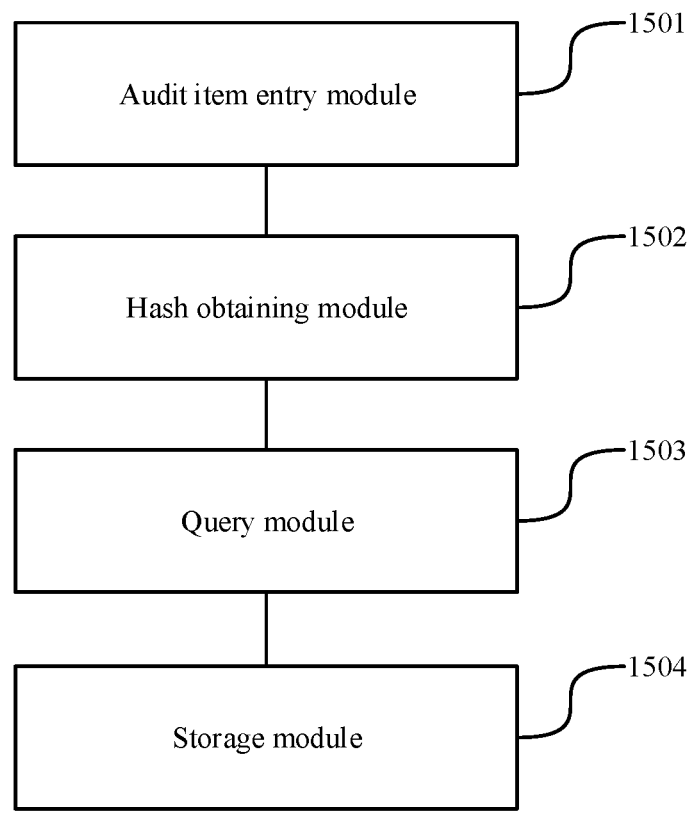
FIG. 15 is a schematic structural diagram of an audit item storage device according to an embodiment of this application.

FIG. 15 is a schematic structural diagram of an audit item storage device according to an embodiment of this application, referring to FIG. 15, the device including: an audit item entry module 1501, configured to obtain a to-be-stored audit item; a hash obtaining module 1502, configured to obtain a second hash value of the to-be-stored audit item; a query module 1503, configured to perform, according to the second hash value, a query in hash values of existing audit items in an auditing domain to which the to-be-stored audit item belongs; and a storage module 1504, configured to skip storing the to-be-stored audit item, in a case that the hash values of the existing audit items include the same hash value as the second hash value.

In one embodiment, the storage module is further configured to store the to-be-stored audit item if hash values of existing audit items do not include the same hash value as the second hash value, and the existing audit items include an audit item whose similarity with the to-be-stored audit item is greater than a first similarity threshold.

In one embodiment, the storage module is further configured to determine, according to a manual evaluation result, whether to store the to-be-stored audit item if hash values of existing audit items do not include the same hash value as the second hash value, and the existing audit items in the same auditing domain include an audit item whose similarity with the to-be-stored audit item is less than a first similarity threshold.

In one embodiment, the device is applied to an audit item storage system, the audit item storage system being configured to store each audit item in the form of a blockchain.

When the audit item storage device provided in the foregoing embodiments performs audit item storage, merely divisions of the foregoing functional modules are used as an example for description. During actual application, the foregoing functions may be allocated to and completed by different functional modules according to requirements, that is, the internal structure of the device is divided into different functional modules, to complete all or some of the foregoing described functions. In addition, the audit item storage method embodiments provided in the foregoing embodiments belong to one conception. For the specific implementation process, refer to the method embodiments.

An embodiment of this application also provides an audit system, the audit system including: an audit item storage subsystem, an on-site audit subsystem, at least one electronic device, and an audit result data storage subsystem; the audit item storage subsystem being configured to store a plurality of audit items; the on-site audit subsystem being configured to interact with the audit item storage subsystem to provide an audit page of a first user, obtain audit result data of the first user, and provide a first hash value of the audit result data of the first user for a first electronic device of the at least one electronic device; the first electronic device being configured to sign the first hash value according to a private key of the first user to obtain first signature data; a second electronic device being configured to sign the first signature data according to a private key of a second user to obtain second signature data, and transmit the second signature data to the audit result data storage subsystem; and the audit result data storage subsystem being configured to store the second signature data in the form of a blockchain.

Figure 16:
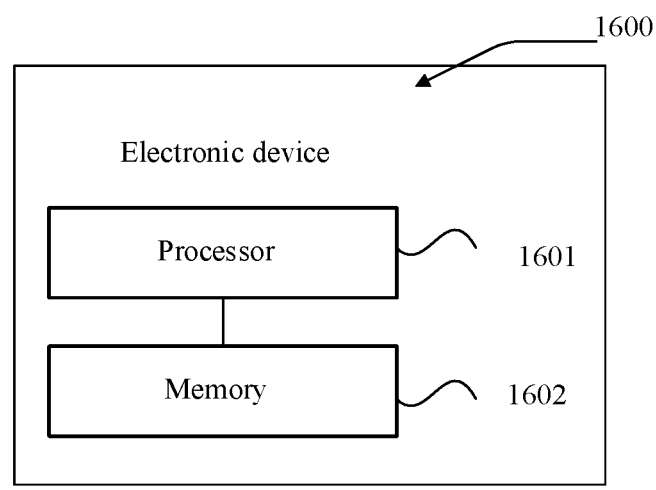
FIG. 16 is a schematic structural diagram of an electronic device according to an embodiment of this application.

FIG. 16 is a schematic structural diagram of an electronic device according to an embodiment of this application. The electronic device 1600 may vary a lot due to different configurations or performance, and may include one or more central processing units (CPUs) 1601 and one or more memories 1602. The memory 1602 stores at least one instruction, the at least one instruction being loaded and executed by the processor 1601 to implement the method provided in the foregoing method embodiments. Definitely, the electronic device may further include components such as a wired or wireless network interface, a keyboard, and an input/output interface, for inputting and outputting. The electronic device may further include another component configured to implement a device function.

In an exemplary embodiment, a computer-readable storage medium is further provided, for example, a memory including instructions. The instructions may be executed by a processor in a terminal, to complete the methods provided in the foregoing method embodiments, for example, the audit result data storage method, the audit result data query method or the audit item storage method in the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An audit result data storage method, comprising:
obtaining, by a first electronic device, a first hash value of audit result data of a first user;
signing, by the first electronic device, the first hash value according to a private key of the first user to obtain first signature data;
transmitting, by the first electronic device, the first signature data to an audit result data storage subsystem, the audit result data storage subsystem being configured to store data in the form of a blockchain;
receiving, by a node device of the audit result data storage subsystem, second signature data transmitted by a second electronic device, the second signature data being used for indicating the first hash value signed by the first user as an audited party and a second user as an auditing party, wherein a plurality of node devices of the audit result data storage subsystem being provided with a consensus mechanism;
verifying, by the node device, the second signature data;
broadcasting, by the node device, the second signature data in the audit result data storage subsystem when the verification succeeds; and
storing, by the node device, the second signature data in the audit result data storage subsystem, when the second signature data is successfully verified by the audit result data storage subsystem by consensus.

2. The audit result data storage method according to claim 1, wherein an audit result in the audit result data of each audit item comprises a hash value of the audit item, a hash value of an eigenvalue of the first user, and a hash value of audit evidence.

3. The audit result data storage method according to claim 1, wherein the signing comprises:
transmitting the first hash value to a trusted execution environment of the first electronic device; and
receiving the first signature data, the first signature data being obtained by signing the first hash value by the trusted execution environment of the first electronic device according to the private key of the first user, the private key of the first user being generated by an audit system after the first user has successfully registered.

4. The audit result data storage method according to claim 1, the method further comprising:
obtaining, by the second electronic device, the first signature data;
signing, by the second electronic device, the first signature data according to a private key of the second user to obtain the second signature data; and
transmitting, by the second electronic device, the second signature data to the audit result data storage subsystem.

5. The audit result data storage according to claim 1, the method comprising:
obtaining, by a third electronic device, a page link address of a query page of a third user by scanning a third graphic identification code provided by an electronic device;
transmitting, by the third electronic device, a web page access request, the web page access request being used for accessing the page link address of the query page of the third user; and
displaying, by the third electronic device, the query page of the third user, the query page comprising an audit result of the third user.

6. The audit result data storage according to claim 5, the method comprising:
obtaining, by an audit item storage subsystem, a to-be-stored audit item;
obtaining, by the audit item storage subsystem, a second hash value of the to-be-stored audit item;
performing, by the audit item storage subsystem, according to the second hash value, a query in hash values of existing audit items in an auditing domain to which the to-be-stored audit item belongs; and
skipping, by the audit item storage subsystem, storing the to-be-stored audit item, if the hash values of the existing audit items comprise the same hash value as the second hash value.

7. An audit result storage system including a first electronic device and a node device, the first electronic device and the node device each comprising a memory and a processor, the memory storing a computer program, wherein:

the computer program of the first electronic device, when executed by the processor of the first electronic device, causing the processor of the first electronic device to perform:
  obtaining a first hash value of audit result data of a first user;
  signing the first hash value according to a private key of the first user to obtain first signature data; and
  transmitting the first signature data to an audit result data storage subsystem, the audit result data storage subsystem being configured to store data in the form of a blockchain; and
the computer program of the node device, when executed by the processor of the node device, causing the processor of the node device to perform:
  receiving second signature data transmitted by a second electronic device, the second signature data being used for indicating the first hash value signed by the first user as an audited party and a second user as an auditing party, wherein a plurality of node devices of the audit result data storage subsystem being provided with a consensus mechanism;
  verifying the second signature data;
  broadcasting the second signature data in the audit result data storage subsystem when the verification succeeds; and
  storing the second signature data in the audit result data storage subsystem, when the second signature data is successfully verified by the audit result data storage subsystem by consensus.

8. The audit result storage system according to claim 7, wherein the signing comprises:
  transmitting the first hash value to a trusted execution environment of the first electronic device; and
  receiving the first signature data, the first signature data being obtained by signing the first hash value by the trusted execution environment of the first electronic device according to the private key of the first user, the private key of the first user being generated by an audit system after the first user has successfully registered.

9. The audit result storage system according to claim 7, the audit storage system including the second electronic device, the second electronic device comprising a memory and a processor, the memory storing a computer program, the computer program, when executed by the processor, causing the processor to perform:
  obtaining the first signature data;
  signing the first signature data according to a private key of a second user to obtain the second signature data; and
  transmitting the second signature data to an audit result data storage subsystem.

10. The audit result storage system according to claim 7, the audit storage system including a third device, the third device comprising a memory and a processor, the memory storing a computer program, the computer program, when executed by the processor, causing the processor to perform:
  obtaining a page link address of a query page of a third user by scanning a third graphic identification code provided by an electronic device;
  transmitting a web page access request, the web page access request being used for accessing the page link address of the query page of the third user; and
  displaying the query page of the third user, the query page comprising an audit result of the third user.

11. Non-transitory computer-readable storage media, storing computer programs, the computer programs, when executed by one or more processors, causing the one or more processors to perform operations of a method, the method comprising:
  obtaining, by a first electronic device, a first hash value of audit result data of a first user;
  signing, by the first electronic device, the first hash value according to a private key of the first user to obtain first signature data;
  transmitting, by the first electronic device, the first signature data to an audit result data storage subsystem, the audit result data storage subsystem being configured to store data in the form of a blockchain;
  receiving, by a node device of the audit result data storage subsystem, the second signature data being used for indicating the first hash value signed by the first user as an audited party and a second user as an auditing party, wherein a plurality of node devices of the audit result data storage subsystem being provided with a consensus mechanism;
  verifying, by the node device, the second signature data;
  broadcasting, by the node device, the second signature data in the audit result data storage subsystem when the verification succeeds; and
  storing, by the node device, the second signature data in the audit result data storage subsystem, when the second signature data is successfully verified by the audit result data storage subsystem by consensus.

12. The computer-readable storage media according to claim 11, wherein an audit result in the audit result data of each audit item comprises a hash value of the audit item, a hash value of an eigenvalue of the first user, and a hash value of audit evidence.

13. The computer-readable storage media according to claim 11, wherein the signing comprises:
  transmitting the first hash value to a trusted execution environment of the first electronic device; and
  receiving the first signature data, the first signature data being obtained by signing the first hash value by the trusted execution environment of the first electronic device according to the private key of the first user, the private key of the first user being generated by an audit system after the first user has successfully registered.

14. The computer-readable storage media according to claim 11, the method further comprising:
  obtaining, by the second electronic device, the first signature data;
  signing, by the second electronic device, the first signature data according to a private key of a second user to obtain the second signature data; and
  transmitting, by the second electronic device, the second signature data to the audit result data storage subsystem.

15. The computer-readable storage media according to claim 11, the method comprising:
  obtaining, by a third electronic device, a page link address of a query page of a third user by scanning a third graphic identification code provided by an electronic device;
  transmitting, by the third electronic device, a web page access request, the web page access request being used for accessing the page link address of the query page of the third user; and
  displaying, by the third electronic device, the query page of the third user, the query page comprising an audit result of the third user.

16. The computer-readable storage media according to claim 15, the method comprising:

obtaining, by an audit item storage subsystem, a to-be-stored audit item;

obtaining, by the audit item storage subsystem, a second hash value of the to-be-stored audit item;

performing, by the audit item storage subsystem, according to the second hash value, a query in hash values of existing audit items in an auditing domain to which the to-be-stored audit item belongs; and skipping, by the audit item storage subsystem, storing the to-be-stored audit item, if the hash values of the existing audit items comprise the same hash value as the second hash value.

* * * * *